(12) United States Patent  
Eilers

(10) Patent No.: US 7,746,358 B2  
(45) Date of Patent: Jun. 29, 2010

(54) INDIRECT IMAGE CONTROL USING A SURROGATE IMAGE

(75) Inventor: Laban D. Eilers, Framingham, MA (US)

(73) Assignee: VistaPrint Technologies Limited, Hamilton (BM)

( * ) Notice: Subject to any disclaimer, the term of this patent is extended or adjusted under 35 U.S.C. 154(b) by 571 days.

(21) Appl. No.: 11/649,186

(22) Filed: Jan. 3, 2007

(65) Prior Publication Data

US 2008/0158255 A1 Jul. 3, 2008

(51) Int. Cl.
*G09G 5/00* (2006.01)
*G06K 9/32* (2006.01)
*G06K 9/36* (2006.01)
*H04N 1/387* (2006.01)
*H04N 1/46* (2006.01)
*H04N 1/40* (2006.01)
*G06F 3/048* (2006.01)

(52) U.S. Cl. .............. 345/629; 345/619; 345/630; 345/626; 358/448; 358/452; 358/537; 382/254; 382/276; 382/284; 715/764

(58) Field of Classification Search ......... 345/619–620, 345/629–630, 418, 632, 654, 672, 626; 358/537–538, 358/452–453, 448, 450; 382/217, 254, 276, 382/284, 293; 715/200, 764
See application file for complete search history.

(56) References Cited

U.S. PATENT DOCUMENTS 5,651,107 A * 7/1997 Frank et al. ............... 715/768
5,880,740 A * 3/1999 Halliday et al. ........... 345/629
5,986,670 A * 11/1999 Dries et al. ............... 345/629
6,384,840 B1 * 5/2002 Frank et al. ............... 345/634
6,891,550 B1 * 5/2005 Nolan ....................... 345/619
2006/0232607 A1 * 10/2006 Davignon et al. ......... 345/629

OTHER PUBLICATIONS

Microsoft; "Microsoft Visio Professional User's Guide, The Microsoft Office Business and Technical Diagramming Solution, Version 2002", pp. 13 and 35, 2001.
Microsoft: Microsoft Office Online Training for Microsoft Office Visio 2003. <http://office.microsoft.com/training/training.aspx?AssetID=RC011928271033>, published in 2003 with release of Visio 2003.
Lennox M. and Bulger, E. Adobe Photoshop 5.0 Certfication Guide. Adobe Press, Jan. 1991, ISBN 0-56830-473-0, pp. 222, 223 and 242-245.

* cited by examiner

*Primary Examiner*—Wesner Sajous
(74) *Attorney, Agent, or Firm*—Jessica J. Costa

(57) ABSTRACT

A system and method for allowing a user to exercise control over a first image that is not directly accessible because it is covered by a second image. Electronic product designs for online user editing are assembled from multiple overlying images. If a content image in a design is positioned beneath a second image, such as an image that adds a visual effect to the content image, a transparent surrogate image of the same size and the same position in the product design as the content image is positioned above the second image. The surrogate image is linked to the content image such that user selection of the surrogate image is interpreted by the system as a request by the user to select the content image, giving the user the impression that the user is directly accessing the content image.

17 Claims, 8 Drawing Sheets

INDIRECT IMAGE CONTROL USING A SURROGATE IMAGE

FIELD OF THE INVENTION

The invention relates to the control of layered images during online product design.

BACKGROUND OF THE INVENTION

Many individuals, businesses, and organizations occasionally have a need to purchase a quantity of custom printed materials, such as business cards, product or service brochures, promotional postcards, personalized holiday cards, birth announcements, party invitations, or any number of other items. Many of these individuals and businesses obtain these products through the web sites of online printing service providers, such as VistaPrint.com operated by VistaPrint Limited.

Online printing service providers, taking advantage of the capabilities of the Web and modern Web browsers, provide document design services for users desiring to create customized documents from any computer with web access at whatever time and place is convenient to the user. These service providers typically provide their customers with the ability to access the service provider's web site, view examples of the types of products offered by the provider, and view images of a variety of pre-designed product templates prepared by the site operator. To give the user a wide range of design suggestions, templates presenting a variety of different styles, formats, backgrounds, color schemes, fonts and designs from which the user may choose are typically presented.

When a user has selected a specific template design to customize, the site typically provides product design tools allowing the user to provide personal information for incorporation into the selected template and, in many cases, to perform other modifications to the template design to create a customized electronic document design. After the user has finished designing the product, the site typically allows the user to place an order for the production and delivery of a desired quantity of printed products to the user's home or business.

Various web-based processes and techniques for allowing a user to customize a product design have been employed. In some prior art applications, all product design inputs from the user, such as the text characters the user desires to appear in the product and the user's selections from menus of color options and font options, are forwarded to the printing service provider server for processing. The server creates the image depicting the product design and downloads it to the user's computer for user review. If the user desires to modify any element of the design, the user must again indicate the desired changes, submit the information to the server and wait for the revised version of the document to be received and displayed. The current state of the product design is retained at the server and, therefore, this product creation approach requires repetitive interaction with, and product image transferring from, the server.

Other printing services providers have opted for downloading a set of software tools to the user's computer that are adapted to execute in the user's browser and provide the user with the ability to perform many WYSIWYG product editing operations in the browser at the client system, such as entering text, changing fonts or font attributes, and resizing, repositioning template elements with little or no interaction with the server in the browser at the client system. Some providers have chosen to implement this type of browser-based design tools using markup language code while others have implemented the tools using Flash authoring software from Adobe Systems Incorporated. With either approach, a significant amount of software code is typically required to implement the wide range of editing functions and the time required to complete the downloading process of the tool set may be considered by some users to be undesirably lengthy.

Downloading a font to a user computer for use by the user's browser tends to significantly increase the delay perceived by the user. Font files tend to be relatively large and, even over a relatively fast network connection, may require a few seconds to download. This delay, even if brief, may lead to user irritation or disappointment. If a user desires to display text in multiple different fonts in the user's product design, the time required to download the multiple different font files will increase accordingly. Users who are impatient or who are interacting with the site over a slow communication channel may opt to abandon the site rather than wait for the full set of tools to complete the download. The loss of these users before they can be engaged in the product design process represents both potential customer dissatisfaction and a potential loss of the revenue to the printing service provider.

In addition, for printing services providers desiring to present a WYSIWYG product design experience to their customers, the lack of a standard browser mechanism for rendering downloaded fonts potentially creates problems in producing a WYSIWYG printed product that faithfully represents the online design viewed and approved by the user. Browser programs from different vendors and even different browser versions from the same vendor may render downloaded fonts in a slightly different manner.

There is, therefore, a need for a system and method of online document design that provides flexible and responsive WYSIWYG editing capabilities while reducing the time required to make the editing tools available to the user at the user's computer.

SUMMARY

The present invention is directed at satisfying the need for allowing a user to select and control an image that is positioned beneath another image.

In accordance with one aspect of the invention, a transparent surrogate image of the same size as a first image is positioned above the first image and also above any other image that is covering the first image. The surrogate image is linked to the first image such that user selection of the surrogate image is interpreted as a request by the user to select the first image.

These and other objects, features and advantages of the invention will be better understood with reference to the accompanying drawings, description and claims.

DETAILED DESCRIPTION

Figure 1:
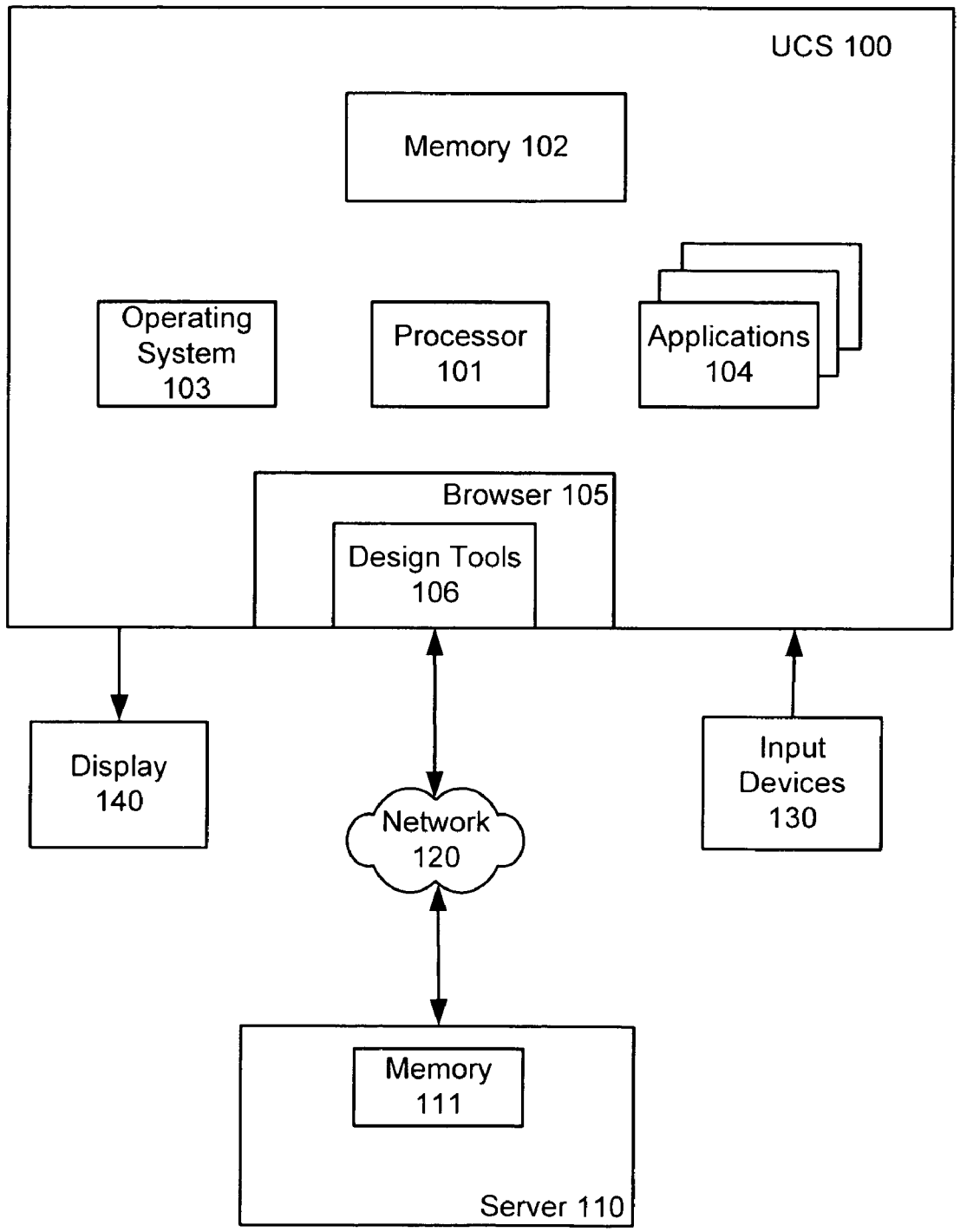
FIG. 1 shows a representative system with which the invention may be employed.

FIG. 1 depicts a representative system with which the invention may be employed. User computer system (hereinafter "UCS") 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer, or other device. The user views images from UCS 100 on display 140, such as a CRT or LCD screen, and provides inputs to UCS 100 via input devices 130, such as a keyboard and a mouse.

When UCS 100 is operating, an instance of the USC 100 operating system, for example a version of the Microsoft Windows operating system, will be running, represented in FIG. 1 by operating system 103. In addition, the user may be running one or more application programs Applications 104. In FIG. 1, UCS 100 is running Web browser 105, such as Internet Explorer from Microsoft Corporation. In the depicted embodiment, design tools 106 is a set of markup language product design tools downloaded to UCS 100 via network 120 from remote server 110. Design tools 106 runs in browser 105 and exchanges information and instructions with server 110 during a design session to support the user's preparation of a customized product design in electronic form. When the customer is satisfied with the design of the product, the design information can be uploaded to server 110 for storage and, if desired by the user, subsequent production of the desired quantity of the physical product on appropriate printing and post-print processing systems.

Server 110 provides data storage and processing support for the web site operations of the printing services provider or other entity offering the online product creation service. While server 110 is shown in FIG. 1 as a single block, it will be understood that server 110 could be multiple servers configured to communicate and operate cooperatively to support web site operations. Server 110 will typically be interacting with many user computer systems, such as UCS 100, simultaneously. Memory 111 represents all components and subsystems that provide server data storage, such as RAM, ROM, and disk drives or arrays. Memory 111 includes the various layouts, designs, colors, fonts, images, and other information provided by the service provider to enable the creation and rendering of product templates.

In interacting with server 110, a user will typically arrive at the site home page and then navigate through one or more product promotion pages, not shown, displaying examples of the types of products offered by the provider and allowing the user to select a particular product type. Within a product type, the user can review one or more pages displaying thumbnail images of various product design templates available from the printing services provider for the selected product type. The site would typically offer a wide range of different templates with different combinations of layouts, color schemes, font schemes, component images, and so forth. After the user has selected the specific design that the user wants to serve as the basis for the user's creation of a personalized design, an initial product customization screen, including the selected electronic editable template, is downloaded from server 110 to USC 100.

Figure 2A:
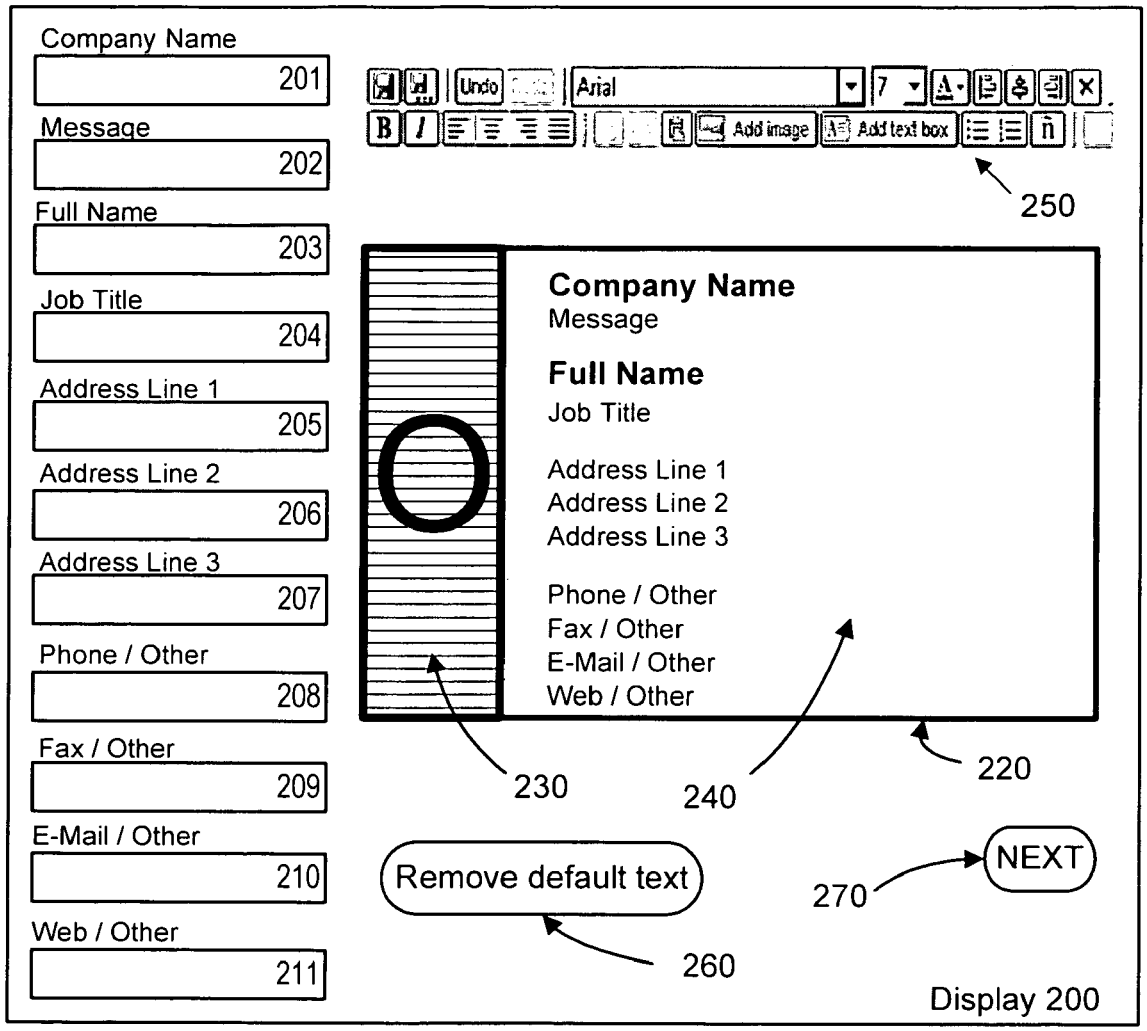
FIGS. 2A-2E depict document customization display screens.

Referring to FIG. 2A, representative online business card creation display 200 is depicted. For the purposes of illustration and discussion, the invention will be described herein in the context of a user who has selected template design 220 and desires to create a custom business card design based on template 220. It will be understood that the invention is not limited to any particular type of product and can be employed in any type of application where there is a requirement or desire to allow a customer to create a customized product design in an online environment. Display 200 may also include various other items, not shown, such as informational, navigational, and promotional banners, messages and links.

In this example of a business card design, text entry fields 201-211 into which the user can enter text are provided. Each text field 201-211 corresponds to a text entry commonly found on business cards. To assist the user in entered the user's personal information, each text entry field 101-111 has an associated text label indicating the type of information suggested for that field. For example, field 201 is indicated as the field for entering the user's company name, field 202 is the field for the user's company message, and so forth. The user is free to enter whatever information is desired in the fields or to leave one or more field empty. When initially displayed to the user, fields 201-211 contain no text. Product customization displays for other types of products would typically provide a different set of text fields with different informational labels corresponding to the type of product being prepared and its anticipated use.

In the template example shown in FIG. 2A, template image 220 has been designed to contain image area 230 and text area 240. The image content of image area 230 is represented generically in FIG. 2A by the oval shape. As will be discussed in more detail below, the displayed image content of image area 230 could be the result of the combination of multiple separate images arranged in an overlying relationship.

To illustrate to the user the location and appearance of the user's information as it would appear in the design, generic default text entries such as "Company Name", "Message", "Full Name" and so forth are initially displayed in template 120 using the default font and font attributes associated with the template by the template designer.

Area 240 could also have an image, color field, design, graphic element, paper effect, or other content acting as a background image and appearing beneath the text. It will be understood that template 220 is merely representative for the purpose of discussion herein.

Each text field in area 240 has an associated font color and associated font properties controlling how text entered in the text field will be rendered, including the name of the font family, font style, font weight, and font size (all collectively referred to herein as "font attributes"), that were selected by the template 220 designer as being complementary to the overall content and style of the template.

To provide a range of additional template 220 editing capabilities to the user, edit tool bar 250 is provided. Edit tool bars, as is known in the art, allow the user to control the appearance of text by selecting a different font family and/or varying other font attributes. As an alternate embodiment, instead of presenting tool bar 250 to all users initially, the printing services provider could implement the template edit display 200 such that a user only gains access to the editing capabilities of tool bar 250 at an extra cost or only upon user request.

Each text field displayed in template 220 is rendered as a separate individual image at server 110 and downloaded to browser 105. The position of each text image within template 220 is maintained by design tools 106 at UCS 100 during the design process. In the disclosed embodiment, the component images in template 220 are created and downloaded from server 110 in one of two image formats depending on whether the image has transparency. Component images with transparency are downloaded in PNG format while images not requiring transparency are downloaded in JPEG format, which generally produces a smaller image file. Server 110 is aware of the format of each component image in template 220 and will automatically download the image in the appropriate format without client request.

While template 120 has been designed to yield a pleasing and functional business card containing eleven common business card data entries, some users may have no need for eleven different entries. A user is not forced to make an entry in each test field 201-211 and may choose to leave one or more fields empty. Alternatively, some users may desire to use more than eleven text fields in the product design. These users may select the "Add text box" button on tool bar 250 to cause an additional text box to be added to the template, initially at a default location such as the upper left corner of template 220. The user can then drag the box to the desired location and enter the appropriate text.

Referring now to FIGS. 2B-2E, representative examples of user text entry and editing will be discussed. For illustrative purposes, the text fields and templates are shown with generic information representing the type of data entries that might be made by a user. All entries entered by a user in text fields 201-211 or entered directly in a text field in template 220 will be generally referred to herein as "text", which will be understood to encompass all characters entered by the user including letters, numbers, punctuation marks, symbols, and the like.

Figure 2B:
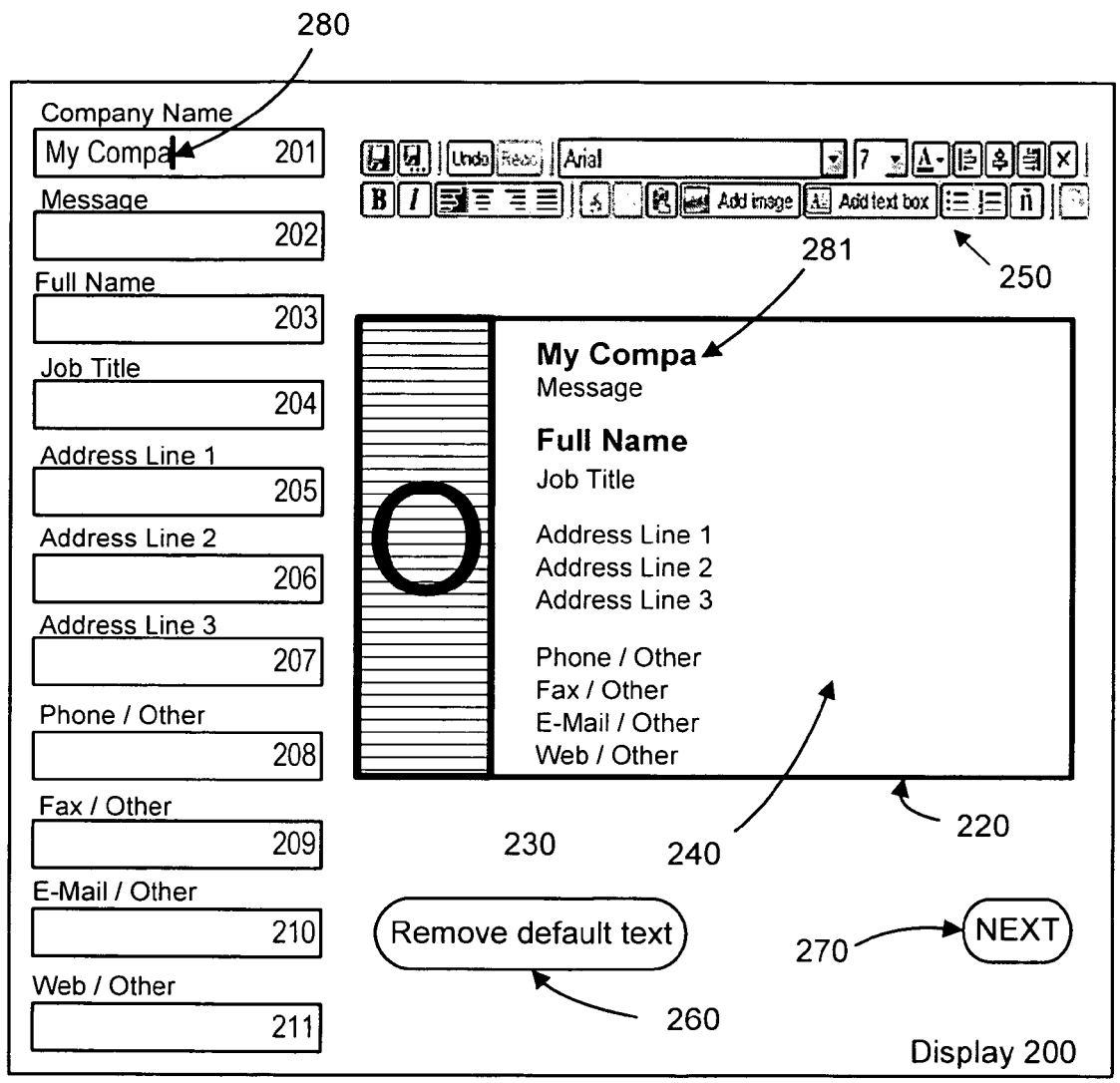

FIG. 2B depicts the status of display 200 after a user has entered a string of characters in field 201. Edit cursor 280 in field 201 indicates the location where the next character will be entered. At this moment, the user has entered "My Compa" and template 220 has been automatically updated, as discussed below, to reflect this user entry. In FIG. 2B, the text "My Compa" 281 displayed in template 220 is an image of the characters in field 201 that was created at server 110 and downloaded to UCS 100. To expedite the generation of the text image at server 110, when the characters entered by the user in field 201 are uploaded to server 110, the necessary information needed at server 110 to render the characters in the appropriate manner is also transmitted as a markup language description of how the text should be rendered. The text is marked up with markup language tags specifying the appropriate font attributes. Structuring the description as marked up text allows the site operator, if desired, to allow the user to specify different font attributes for individual characters or strings of characters within a single text field.

Because all necessary font attribute information is received at the server with the user-entered characters from the text field, the server is not required to make memory calls to retrieve prior state information, thereby minimizing the time required to receive the image back from the server. Whenever a user selects a text field 201-211 to edit and initiates entry of any characters, the default text initially displayed in template 220, such as "Company Name", is removed and replaced with an image of the user-entered characters.

In the disclosed embodiment, a character entry in one of the fields 201-211 does not inherently trigger a transmission to server 110 for a revised text image. Whether one or more than one character entered by a user in the fields 201-211 are uploaded at one time to server 110 for the generation of a new text image depends on the rate at which the user is entering characters into the field. To avoid requiring the server to generate and download many revised images in a very short period of time while text is being entered very rapidly by a fast typist, characters from a text field 201-211 are uploaded to the server only when 350 milliseconds have passed since the last user keystroke. Delay interval periods of more or less than 350 ms could be employed, if desired. Because the file sizes transferred between the user system and the server are relatively small, only a slight delay is experienced between the uploading of the text information to server 110 and the receipt at the user computer of the revised text image.

Rather than use text fields 201-211, some users may desire to approach the customization process by editing text fields directly in template 220. As an alternative to entering text in fields 201-222, the user could individually select and edit the individual text fields in template 220, as will be discussed further below in connection with FIG. 2E.

Figure 2C:
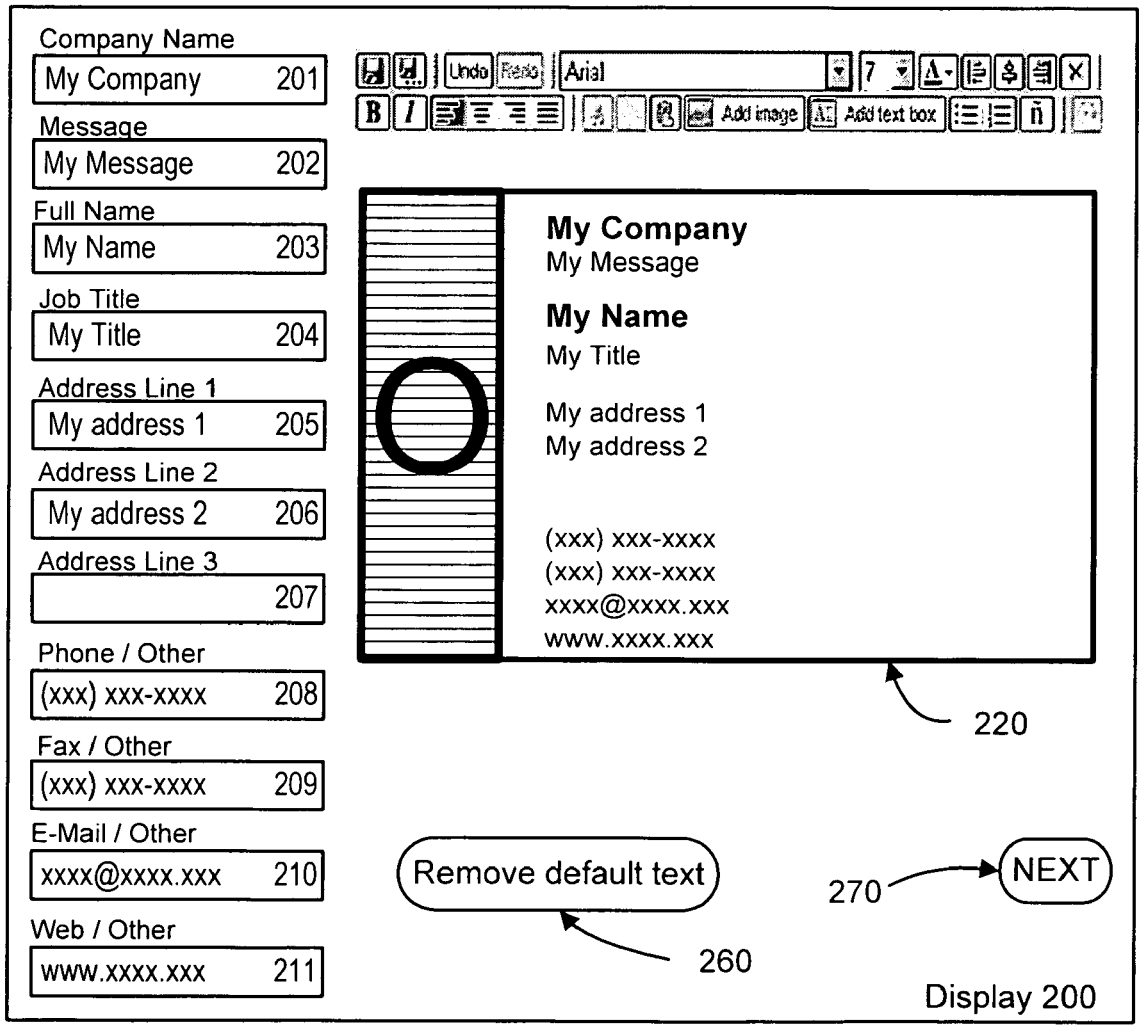

FIG. 2C depicts the status of display 200 after the user has entered text in fields 201-206 and 208-211. Template 220 has been updated with the user-supplied text and the default text "Address Line 3" that appeared in the initial template 220 design has been removed. Default text displayed in template 220 for any unused fields can be removed by the user at any time by the clicking the "remove default text" button 260. Alternatively, the user can accomplish the removal of default text by selecting the unneeded text field 201-211 and then making any keystroke not yielding a displayed character, such as the space bar, the delete key or the backspace key. As another alternative, the user could select the undesired default text field in template 200 and edit the contents of the text field to delete the undesired default text. If a text field contains no visible characters, this situation is recognized and handled by design tools 106 at the client computer. A server-generated image for "empty" text fields is not requested.

As mentioned above, the template designer employed by the site operator selected the initial default font attributes and selected default locations in the template where the text fields would appear, but the user is allowed, if desired, to change any or all of these default elements. To edit the content or position of a text field in the template, the user must first select the desired text box. In the disclosed embodiment, each text box has two states of selection: a first state for the purpose of changing the location and/or size of the text field and a second state for changing the text content and/or font attributes associated with the characters in the text box. To place a text box in the first selected state, the user can position the cursor over the text area in template 220 and click once. To place a text box in the second selected state, the user can position the cursor over the text area of interest and double click.

Figure 2D:
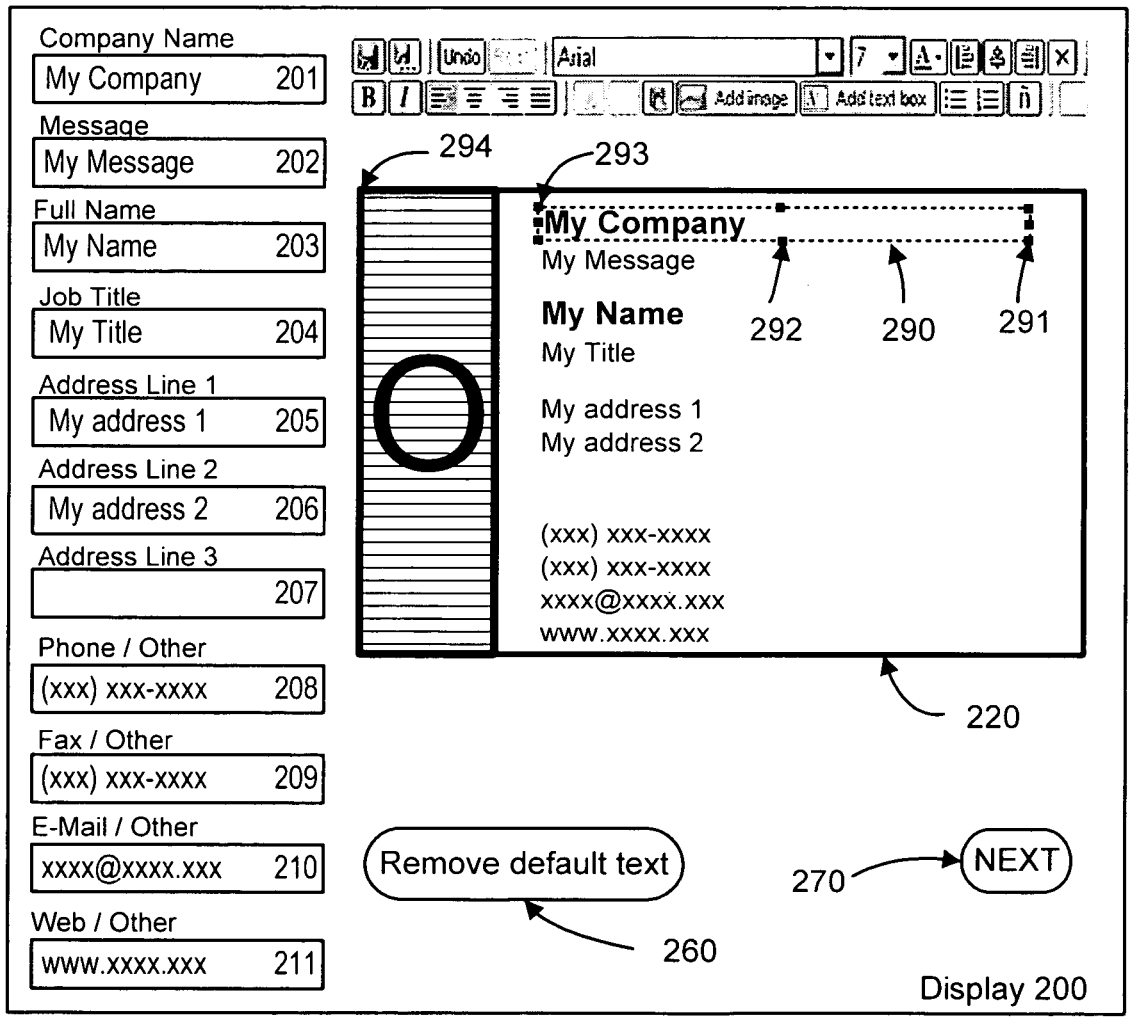

In FIG. 2D, the user has placed text box 290 in the first selected state. In the disclosed embodiment, the first state is visually indicated to the user by the displaying of a dashed line border around the selected text box. When a text box is in this first selected state, the user can reposition the text box using standard click-and-drag techniques or can resize the text box in the standard manner using one of the four corner handles, such as corner handle 291, or one of the four side handles, such as side handle 292.

During the product design process, the current state of the template design is retained by design tools 106 at the user's computer, not at server 110. Design tools 106 maintains the position information for all component images of template 220. In the disclosed embodiment, design tools 106 retains the positional coordinates of the upper left corner of each image, such as corner 293 of text image 290, relative to the upper left corner 294 of the template. Whether or not design tools 106 communicates with server 110 in response to a user action when a text image is in the first selected state depends on the particular user action that was performed.

If the user merely performed a drag and drop operation to move a text image from one position to another position in template 220, the size of the text image does not require revision. In this situation, design tools 106 simply retains the new coordinates of the upper left corner of the text image at its new position in template 220. If, however, the user changed a font attribute, or resized the text image container using one of the side or corner handles, there is a possibility that the displayed appearance of the text may be affected. For example, changing a font attribute may cause the length of the text to change sufficiently to cause the text to become wrapped (or unwrapped) within the text box. Similarly, if the user changes the width of the text box, a string of text that was formerly displayed in the box on a single line might require wrapping onto multiple lines or vice versa. Therefore, each time the user performs such an operation, design tools 106 will forward the width of the text image along with the character and font attribute information to server 110. Based on the received information, server 110 will generate and return a new text image of that text for incorporating into template 220 at the user computer. Because the current state of the template design is retained at the user computer during the design process, server 110 need not retain a copy of text images or be aware of the position of the text images in the template design while the design is being created.

Figure 2E:
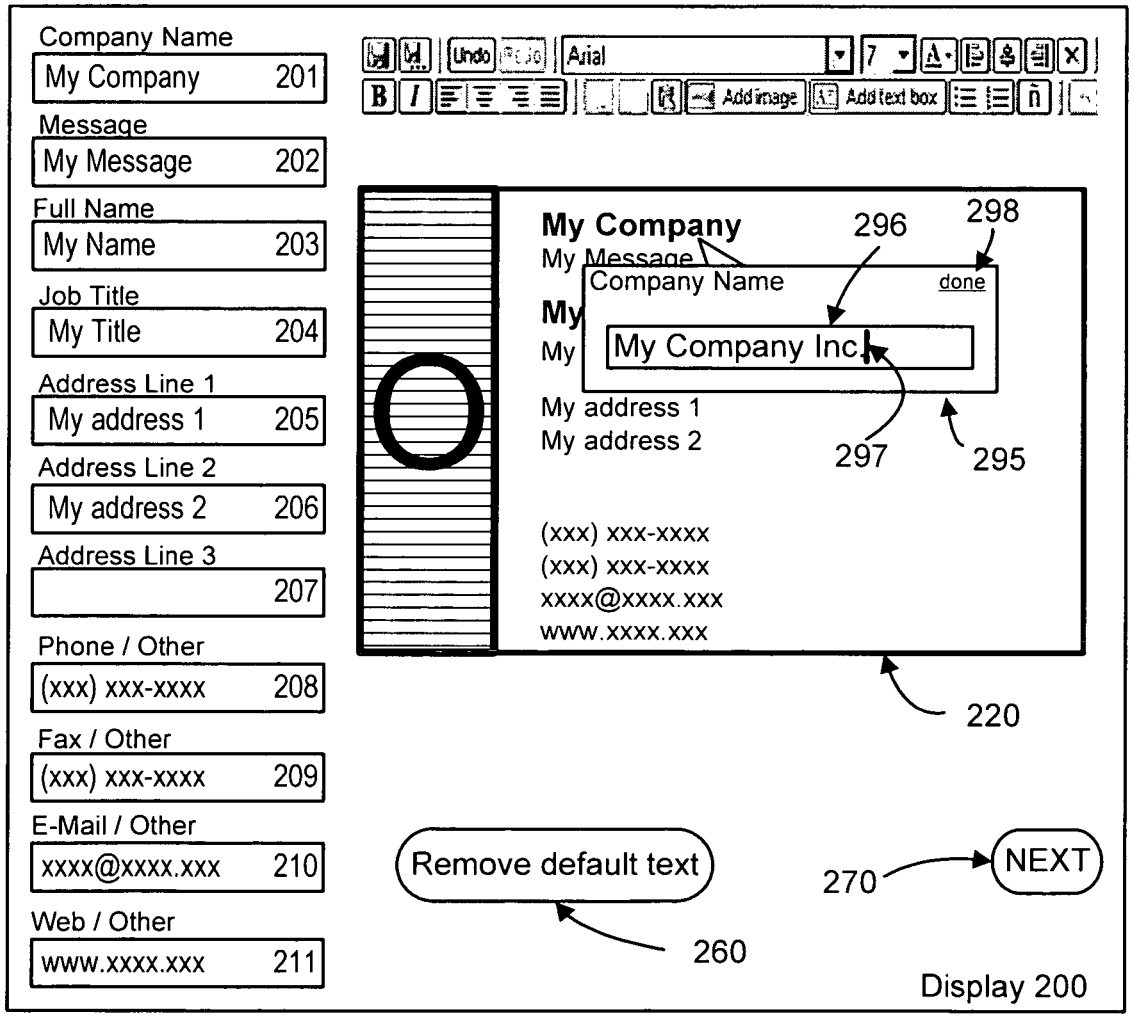

In the situation depicted in FIG. 2E, the user has double clicked on the "My Company" text area in template 220 and placed that text area in a second selected state, indicated to the user by the displaying of text edit window 295 adjacent to the selected text area. Window 295 contains text field 296 wherein the user can enter new text or revise existing text. When window 295 is opened, text field 296 contains the same text as is currently displayed in template 220 in the associated text field. At the moment depicted in FIG. 2E, the user has entered the additional characters "Inc." in text field 297. Cursor 297, positionable by the user, indicates the location with text field 297 where the next character, if any, entered would appear.

As the user is entering or modifying the text in window 295, the user's edits are being sent to server 110 and an updated text image is being automatically received from server 110 and reflected in template 220 using the same process as was discussed above in connection with user edits in fields 201-211 (FIG. 2B). When the user has completed the desired revisions to the text in text field 296, the user can close window 295 by selecting "done" 298. It will be understood that editing of text fields in template 220 could be implemented in other ways, if desired. For example, instead of using window 295, editing could be implemented to appear to the user as if the user is performing inline text editing in template 220. In other words, referring again to FIG. 2D, the user could be allowed to directly edit the text in a textbox, similar to textbox 290, opened in the same position in template 220 as the current text image. This text editing would be at the correct position in template 220, but would be rendered in a system font available at the browser, which in many cases would not be the same font as used to render the text image at the server. When the user has finished with the edits, the server would generate a revised image in the correct font for incorporation into the template and the temporary system font text used for the editing in template 220 will be replaced with the server 110 image.

At any time that the user is satisfied with the design displayed in template 220, the user can select "next" button 270 to cause design tools 106 to transmit the current design, including all user text, text attributes, and text box positions, to server 110 for storage and move on to another step in the process, such as the placing of an order for the production and delivery of a desired quantity of the printed product.

To provide templates that are relevant and attractive to as broad a range of different types of customers and customer interests as possible, the printing services provider will typically design many different templates containing not only a variety of different layouts, colors, and fonts, but also a wide variety of different images. For example, the provider often incorporates one or more photographs or other images of people, places, animals, or objects for the purpose of indicating a particular business occupation or leisure activity, suggesting a concept, or evoking an emotion. This type of image is referred to generally herein as a "content image".

Figure 3:
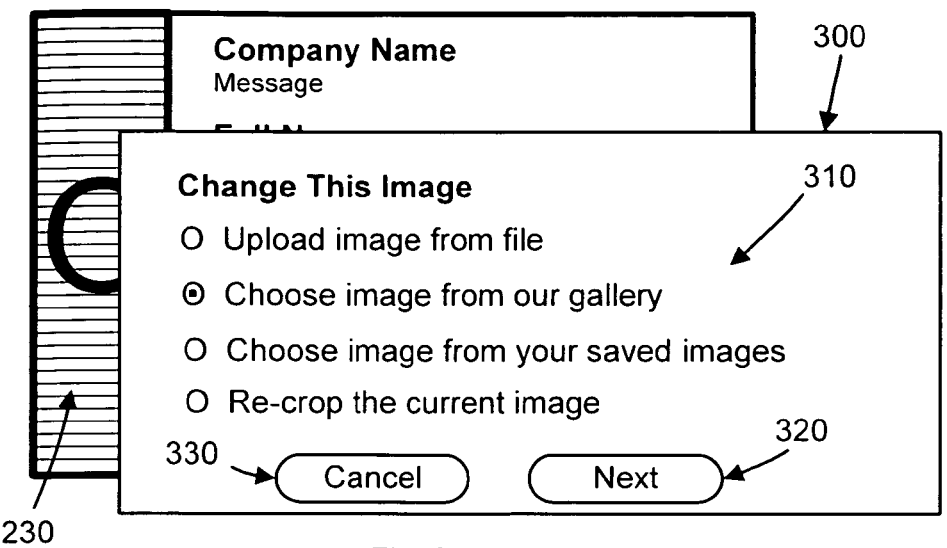
FIG. 3 shows an illustrative image change screen.

In addition to providing tools allowing the customer to enter, edit and position text and to upload, size and position user images as discussed above, the system described herein also provides the user with the ability to modify or replace a component content image in a product design template. Referring to FIG. 3, if the user indicates the user's desire to change a component content image, for example by positioning the cursor over image area 230 and double clicking with the user's mouse, Change This Image window 300 is displayed to the user. In the disclosed embodiment, window 300 presents the user with four options 310 regarding the selected image. These options include (a) re-cropping the content image currently displayed in image area 230, (b) replacing the current content of image area 230 with a different image by uploading a replacement image from a remote file accessible to the user, (c) replacing the current content image with a different image to be selected by the user from a gallery of alternate images maintained by the printing services provider, and (d) replacing the current image with a different image to be selected by the user from images that may have already been uploaded during an earlier design session for another product and saved in connection with the user's account. The user selects a desired option using the radio buttons displayed by each image change option and then selects "Next" button 320 to initiate that operation. If the user decides not to make any change, the user can select "Cancel" button 330 to close window 300. Techniques for uploading and saving images and performing image cropping operations are well known in the art.

In the disclosed embodiment, some aspects of image area 230, such as its size and position within template 220, are fixed features of the layout of the template and not subject to user modification. The service provider could, if desired, implement the layout so as to allow user to also exercise some control over these aspects of image area 230.

While a user may perceive an image area in a template, such as image area 230, as containing a single image, what the user is viewing may actually be the result of the combination of multiple separate images. In the template example depicted herein, the service provider has created a visual effect by placing another image, referred to generally herein as a "masking image", above the content image to alter or enhance the presentation or appeal of the content image. A masking image could be any type of image that totally or partially overlies a content image. For example, a masking image comprised of a geometric vector shape containing a gradient or other fill allowing the underlying content image to be at least partially seen could be employed. Alternatively, one or more geometric elements having some transparent regions and some visible regions could be assembled to create the visual effect that the underlying content image is being presented in a picture frame, viewed through prison bars, seen behind hanging vines, or any number of other visual effects that alter or heighten the style, mood, or appearance of the content image. If the visual effect presented in the template was achieved by the assembly of multiple overlapping shape elements, the server will flatten all of the elements into a single masking image for downloading to the user system. As will be understood by those in the art, the use of geometric vector shapes to create masking images is not essential and other languages, methods or applications capable of generating a Web-compatible image for downloading to the user's computer system could be employed.

To allow a user to initiate a change to the content image, the user must be provided a technique to identify or "select" the content image for editing. Selecting an image is straightforward if the image is readily available by being on top of other image layers that may be present in the template design, but this is not the case where a masking image is positioned above the content image. In this situation, user control over the content image is accomplished through the incorporation of a transparent image, referred to herein as a "surrogate image", which has the same size and position in the template and is maintained in a linked relationship to the content image. The linking of the content image with the surrogate image provides the user with the illusion that the user is directly selecting content image when in reality the user is indirectly accessing the content image through the user's interaction with the surrogate image.

Figure 4:
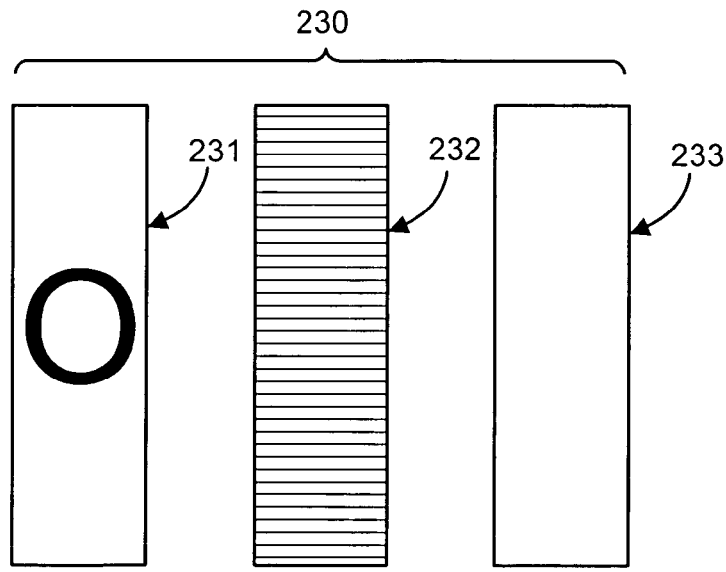
FIGS. 4 and 5 depict component images comprising the displayed content of image area 230.
Figure 5:
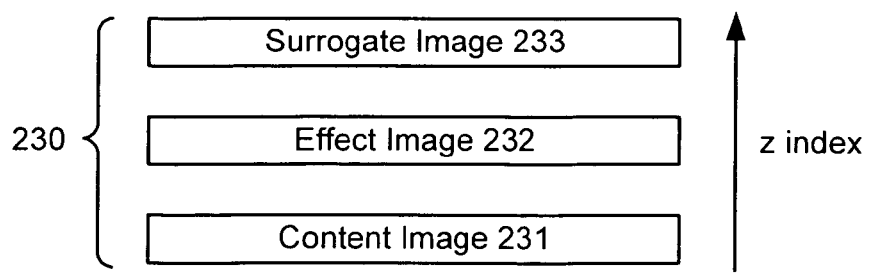

By way of illustration, referring to FIGS. 4 and 5, in the image area 230 example discussed herein, what the user is viewing in image area 230 is the result of displaying transparent surrogate image 233 over masking image 232 which is in turn displayed over content image 231. As discussed above, masking image 232 could contain a wide variety of visible content and is represented in these figures by horizontal lines solely for the purpose of facilitating identification and explanation herein. Also, while masking image 232 is shown in FIG. 4 as being positioned directly above and having the same size as content image 231, this will not always be the case for all masking images in all templates, therefore the masking image is not directly suitable for use as a proxy for the content image.

Positioning surrogate image 233 as the top image in this image group provides the user with the illusion that the user is directly selecting and interacting with content image 231. If the user double clicks over image area 230, the user is actually selecting surrogate image 233, but the action is recognized and interpreted by design tools 106 as a desire by the user to select underlying content image 231.

Figure 6:
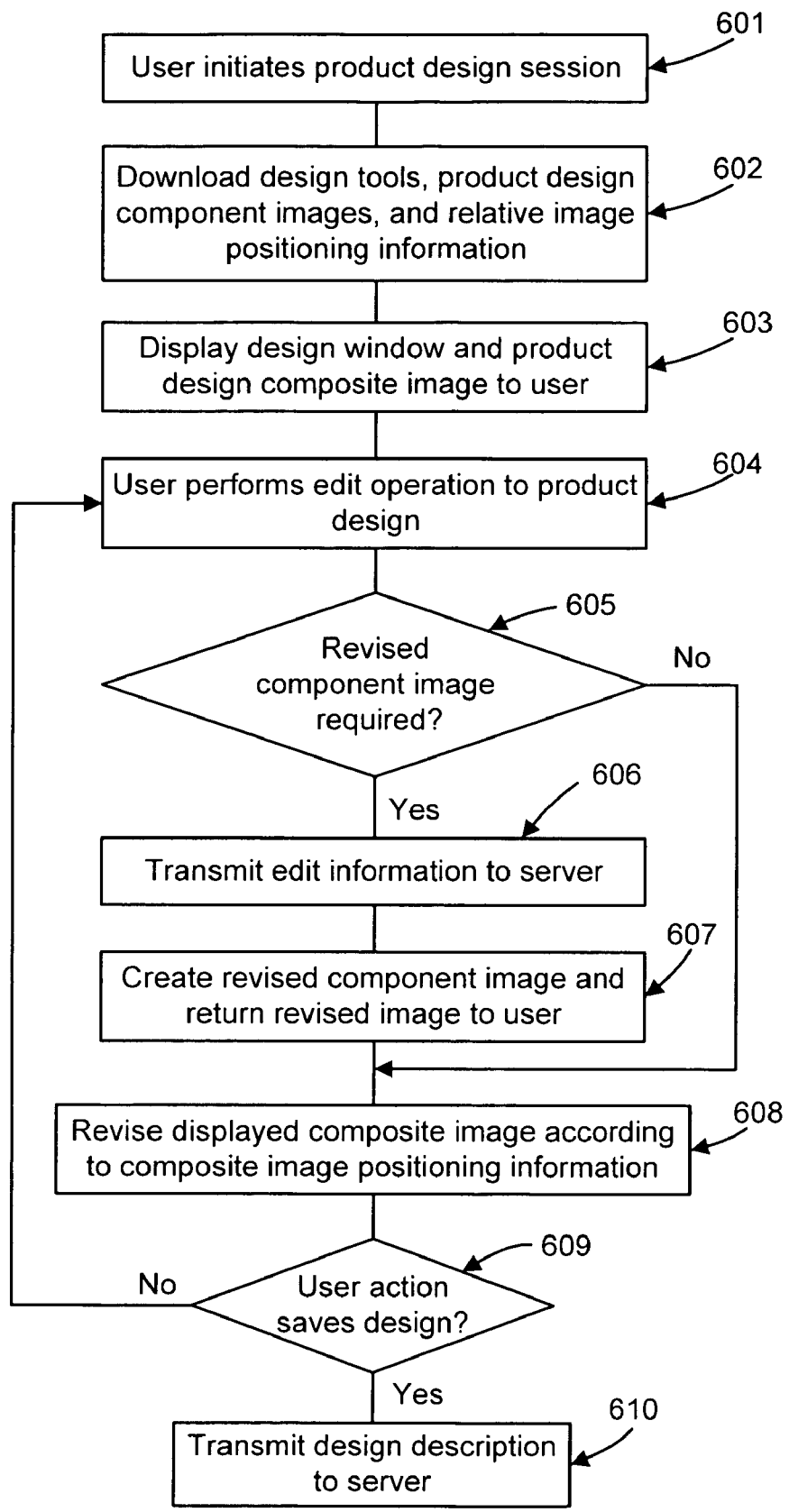
FIG. 6 shows a flow chart of one method for employing the invention.

Looking at FIG. 6, one embodiment of a method for creating an electronic product design employing multiple separate component images will now be discussed. At step 601, a user initiates a product design session at a printing service provider web site, for example by selecting one of the available pre-designed templates for customization. At step 602, server 110 downloads design tools 106, including customization display 200 and the component images that combine to yield the initial image of template 220, to the user's computer. At step 603, display 200 and the initial default design of template 220 are displayed to the user at the user's computer.

At step 604, the user performs an edit operation that will have the effect of altering the appearance of template 220. As discussed above in connection with FIGS. 2A-2E, some edit operations will require uploading information to server 10 for the generation of a revised component image and some will not. At step 605, if the edit operation is the type of operation that will or may alter the appearance of the content of a component image, such as entering text in text fields 201-211, resizing the text container, or editing the text content of an image, the relevant edit information will be transmitted to server 10 at step 606 for generation of a revised image.

When a revised text image is required from server 10, the text characters, the identifiers of the font and font attributes for the text, and the size of the text box containing the text are supplied to server 110 to allow the server to generate and return the image of the text as quickly as possible. Server 110 will create and return a revised image at step 607. Based on the image position coordinates for the component image maintained at the user computer by design tools 106, the revised image received from server 10 will be incorporated into template 220 at the appropriate position.

If the user operation at step 604 does not require the creation of a revised component image at step 605, for example if the user operation was only to click and drag an existing component image to another location without changing the size or content of the image, the template 220 image is updated at step 608 by design tools 106 based on the new image position information with no server involvement.

At step 609, the user can continue with customizing the template by performing another edit operation or can conclude the design session and move on to another step in the ordering process. As discussed above, while a user is editing the individual component text fields in the template 220 design, the template image will be frequently and incrementally updated with revised versions of individual component images to continuously present the user with the most current version of the product design in progress. Steps 604-608 will, therefore, typically be repeated many times during the course of a product design session.

When the user has completed the custom product design and desires to terminate the design session, the user can save the current template design by clicking "next" button 270. In response to next 270, design tools 106 will forward the design description information to server 110 for retention and eventual production of the product by printing or other production process. The design description will include the final position, size, and content information for each component text image in the template design, allowing the template design to be subsequently generated at server 110 for printing or other processing.

While the invention has been shown and described in various exemplary embodiments, the described embodiment is to be considered as illustrative rather than restrictive. For example, the template design being customized could be for a product to be printed on paper or on any other printable medium such as cloth, glass, plastic, rubber, or wood. The design could be for a complete product, or intended to be incorporated into a larger product, such as a section, side, or page. The scope of the invention is as indicated in the following claims and all equivalent methods and apparatus.

What is claimed is:

1. A computer-implemented method for allowing user selection of a first image in an electronic product design having images configured in a layered arrangement such that the first image is at least partially overlaid by a second image, the method comprising:

positioning a third image in the electronic product design, the third image being substantially the same size and position in the electronic product design as the first image, and placed in a layer above the second image, interpreting user selection of the third image as the user's selection of the first image, and in response to user selection of the third image, providing one or more options for allowing the user to edit the first image without editing the third image.

2. Computer storage tangibly embodying computer-readable data which, when processed by a computer, causes the computer to render an electronic product design on a user's display, the computer-readable data comprising;

computer-readable data corresponding to a first image component in a first layer, computer-readable data corresponding to a second image component in a second layer, the second image component being positioned to at least partially overlay the first image component, and computer-readable data corresponding to a third image component in a third layer, the third image component being positioned to substantially directly overlay the first image component and at least partially overlay the second image component the third image component having a linked relationship with the first image component such that user selection of the third image component results in selection of the first image component for editing the first image without editing the third image.

3. The method of claim 1 wherein at least one of the one or more options allows the user to replace the first image in the product design with a different image.

4. The method of claim 1 wherein at least one of the one or more options allows the user to change the cropping of the first image such that the portion of the first image used in the product design is changed.

5. The method of claim 1 wherein the third image component is transparent.

6. Computer storage of of claim 2 wherein the third image component is transparent.

7. Computer storage of claim 2 wherein the second image component comprises a masking image allowing the first image component to be at least partially seen therethrough.

8. Computer storage of claim 7 wherein the masking image is assembled from a plurality of masking image component images.

9. A method for electronic product design comprising displaying an electronic product design having image content assembled from first, second, and third image components configured in a layered arrangement such that the first image component is at least partially overlaid by the second image component and the second image component is at least partially overlaid by the third image component, the third image component having substantially the same position in the electronic product design as the first image component, and in response to user selection of the third image component, presenting the user with one or more options for allowing the user to modify the electronic product design by changing the first image component without changing the third image component.

10. The method of claim 9 wherein at least one of the one or more options allows the user to replace the first image component with a different image.

11. The method of claim 9 wherein at least one of the one or more options allows the user to change the cropping of the first image component.

12. Computer readable storage media having stored thereon instructions which, when executed by a computer, implement an electronic product design method comprising:

displaying to a user an electronic product design having image content assembled from first, second, and third image components configured in a layered arrangement such that the first image component is at least partially overlaid by the second image component and the second image component is at least partially overlaid by the third image component, the third image component having substantially the same position in the electronic product design as the first image component, and in response to user selection of the third image component, displaying to the user one or more options for allowing the user to modify the electronic product design by changing the first image component without changing the third image component.

13. A method for electronic product design comprising providing to a user system an electronic product design having image content assembled from first second, and third image components configured in a layered arrangement such that the first image component is at least partially overlaid by the second image component and the second image component is at least partially overlaid by the third image component, the third image component having substantially the same position in the electronic product design as the first image component, and in response to selection of the third image component by the user of the user system, allowing the user to modify the electronic product design by changing the first image component without changing the third image component.

14. The method of claim 13 further comprising producing one or more printed versions of the electronic product design.

15. A system for allowing user selection of a first image in an electronic product design having images configured in a layered arrangement such that the first image is at least partially overlaid by a second image, comprising:

at least one processor configured to position a third image in the product design, the third image being substantially the same size and position in the product design as the first image, and placed in a layer above the second image, at least one processor configured to interpret user selection of the third image as the user's selection of the first image, and at least one processor configured to provide one or more options for allowing the user to edit the first image without editing the third image in response to user selection of the third image.

16. A system for electronic product design comprising at least one processor configured to display an electronic product design having image content assembled from first, second, and third image components configured in a layered arrangement such that the first image component is at least partially overlaid by the second image component and the second image component is at least partially overlaid by the third image component, the third image component having substantially the same position in the electronic product design as the first image component, and at least one processor configured to present, in response to user selection of the third image component, the user with one or more options for allowing the user to modify the electronic product design by changing the first image component without changing the third image component.

17. A system for electronic product design comprising at least one processor configured to provide to a user system an electronic product design having image content assembled from first, second, and third image components configured in a layered arrangement such that the first image component is at least partially overlaid by the second image component and the second image component is at least partially overlaid by the third image component, the third image component having substantially the same position in the electronic product design as the first image component, and at least one processor configured to allow the user, in response to selection of the third image component by the user of the user system, to modify the electronic product design by changing the first image component without changing the third image component.

* * * * *